United States Patent [19]

Stanton

[11] 4,098,578
[45] Jul. 4, 1978

[54] IONIZATION OF EXHAUST GASES

[76] Inventor: Anthony A. Stanton, 1412 Boston Ave., Fort Pierce, Fla. 33450

[21] Appl. No.: 690,875

[22] Filed: May 28, 1976

Related U.S. Application Data

[63] Continuation-in-part of Ser. No. 543,150, Jan. 21, 1975, abandoned.

[51] Int. Cl.² ............... F01N 3/10; F02M 27/04; B01J 1/10
[52] U.S. Cl. .......................... 23/277 C; 55/2; 55/149; 55/DIG. 30; 55/DIG. 41; 60/275; 123/119 E; 250/433; 250/437; 250/438
[58] Field of Search ........... 23/277 C, 288 F; 55/2, 55/149, DIG. 30, DIG. 41; 60/275; 250/432 R, 433, 435, 437, 438; 123/119 E; 361/226, 229

[56] References Cited

U.S. PATENT DOCUMENTS

| | | | |
|---|---|---|---|
| 1,678,778 | 7/1928 | Harter | 23/288 FC UX |
| 2,088,604 | 8/1937 | Littlefield | 361/226 X |
| 2,455,738 | 12/1948 | Crise | 55/149 X |
| 2,926,276 | 2/1960 | Moriya et al. | 123/119 E UX |
| 2,998,308 | 8/1961 | Ruth | 23/288 F UX |
| 3,180,083 | 4/1965 | Heller | 23/288 F X |
| 3,228,755 | 1/1966 | Lottinville | 23/288 F UX |
| 3,276,202 | 10/1966 | Gary | 23/288 F UX |
| 3,376,211 | 4/1968 | Bjornson | 250/542 X |
| 3,522,015 | 7/1970 | Maniero et al. | 250/542 X |
| 3,537,829 | 11/1970 | Ott | 123/119 E UX |
| 3,620,008 | 11/1971 | Newbold | 23/277 C X |
| 3,674,668 | 7/1972 | Bjornson et al. | 250/542 X |
| 3,755,120 | 8/1973 | Kinser | 250/542 X |
| 3,768,258 | 10/1973 | Smith et al. | 60/275 |

FOREIGN PATENT DOCUMENTS

| | | | |
|---|---|---|---|
| 1,908,685 | 9/1970 | Fed. Rep. of Germany | 23/277 C |
| 704,606 | 2/1954 | United Kingdom | 250/542 |

*Primary Examiner*—Barry S. Richman
*Attorney, Agent, or Firm*—Gustave Miller

[57] ABSTRACT

An apparatus for treating exhaust gases from an internal combustion engine by mixing with other fluids in an enclosed mixing chamber by cyclonic action while subjecting the mixture to a rotating interrupted high voltage direct current electrical field which sweeps through the mixture.

24 Claims, 8 Drawing Figures

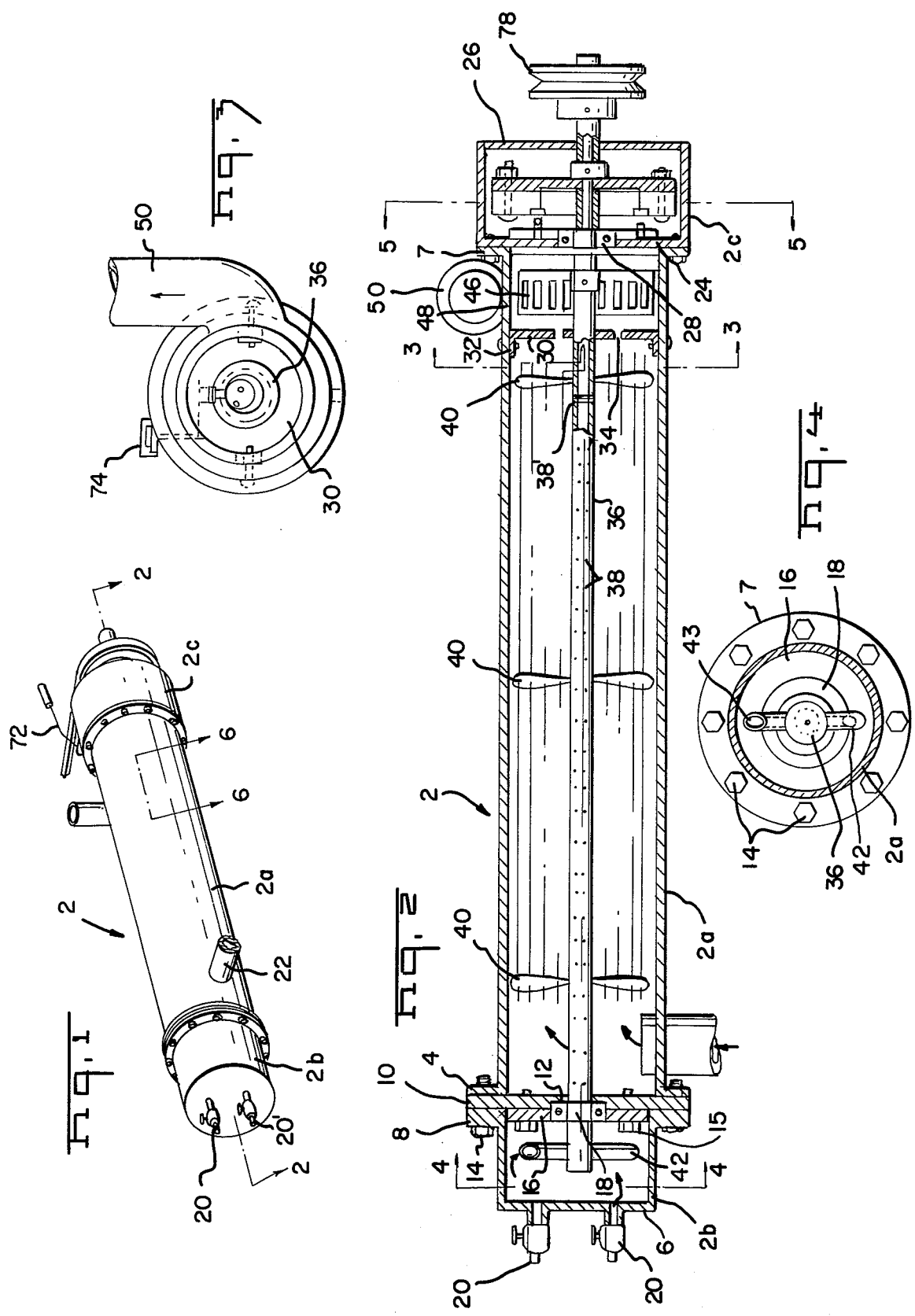

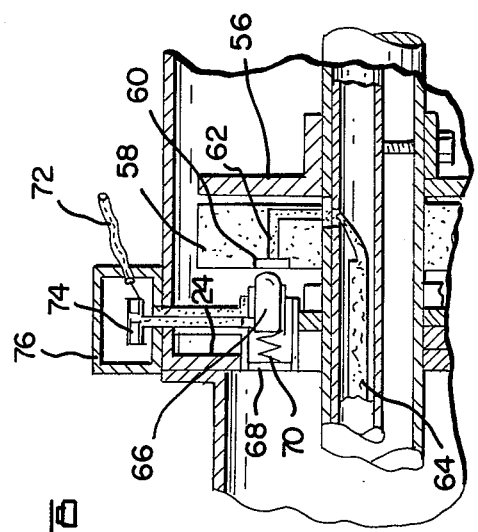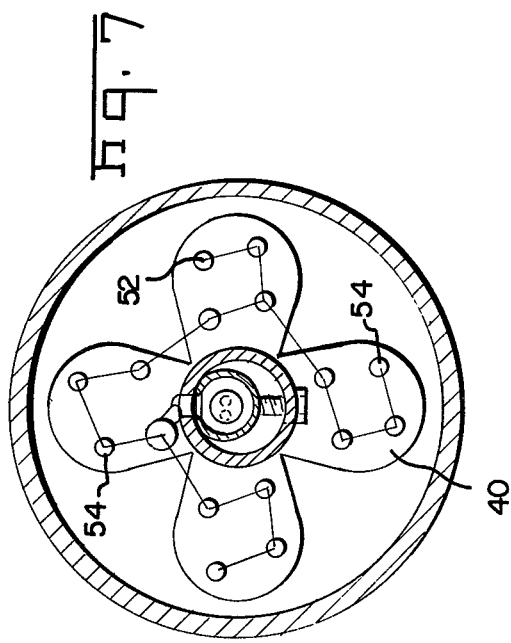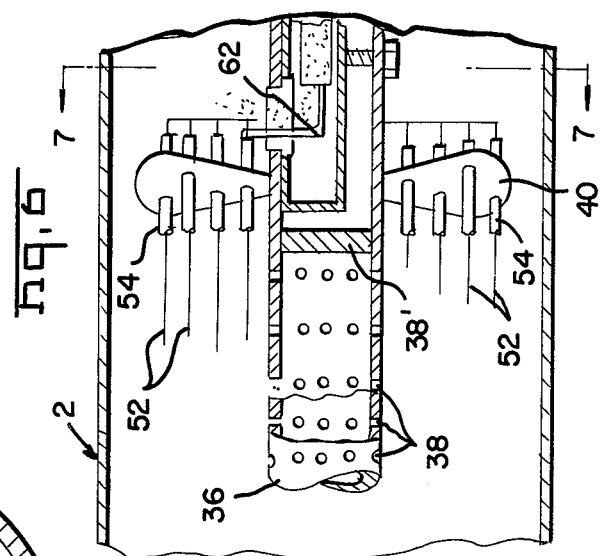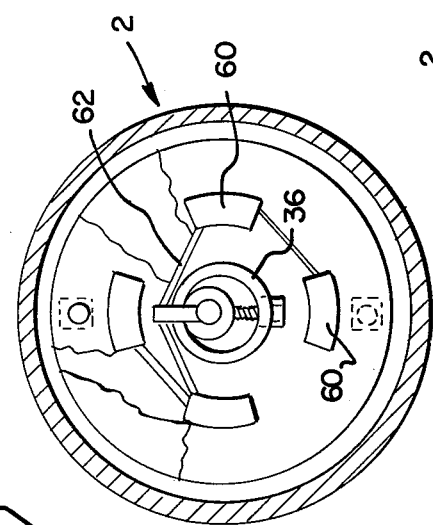

IONIZATION OF EXHAUST GASES

This application is a continuation-in-part of application Ser. No. 543,150, filed Jan. 21, 1975, now abandoned.

This invention relates to an apparatus for treating exhaust gases emanating from an internal combustion engine or for treating the products of combination emitted from the stack of a power generating plant.

It is known that in the exhaust from an internal combustion engine there exists in many cases unburned hydrocarbons which if properly treated could be returned to the intake and utilized as fuel. Not only would such treatment of the exhaust prevent waste but would also lower the pollutants ordinarily emitted into the atmosphere.

To accomplish this, my invention when in use would be attached to the automobile, boat or industrial engines in a position so that the exhaust gases would be funneled into the intake of the invention. The invention which as detailed in the enclosed drawings has a cylindrical body called a chamber, containing a hollow rotating shaft, upon which are attached propeller fan shaped supports. These fan shaped supports are spaced apart, three or more are used, but a greater number would be used for a larger device. Passing through insulators on the fan shaped supports are metal rods which are all connected to a strong electrical current. As there are four blades to each fan and four rods to each blade, a total of 16 rods rotating in the chamber, a highly charged electrical field is created. Into this electrical field of cyclonic action is conducted exhaust gas thru an inlet pipe into the chamber. Also through vent holes in the rotating shaft there is brought into the electrical field additions of water vapor, hydrogen peroxide or alcohol to fortify the exhaust. Thru electrical ionization the atoms of the molecules of unburned hydrocarbons and carbon monoxide plus the induced hydrogen and oxygen atoms are reionized in the process; that is, the intermingling of the electriclly charged ions of the atoms of the exhaust gases and injected vapors in the rotating electrical field are through their travel in the mixing chamber and contacting the rods, certain molecules touch the electrodes and become charged or ionized. The rotating of the electrical field as stated before is cyclonic in nature and has properties of a vacuum assisting in converting the exhaust gases. Electrical current is applied intermittently to the rods.

It is therefore an object of this invention to ionize exhaust gases from an internal combustion by subjecting them to a high intensity electrical field movable therethrough.

It is another object of this invention to mix exhaust gases from an internal combustion engine with other fluids and to ionize the mixture by subjecting it to a high intensity electrical field movable therethrough.

It is a further object of this invention to intermingle treating fluids with internal combustion engine exhaust gases in a confined chamber by cyclonic action and ionizing the mixture with a high intensity field movable through the gases during such intermingling.

It is a still further object of the invention in addition to the objects to provide a regularly recurring high intensity direct-current electrical field movable through a mixture of fluids confined in an enclosed chamber.

With the above and other objects in view, a description of the invention in detail follows with specific reference to the Figures of the drawing in which:

FIG. 1 shows the exterior of the apparatus of the invention in perspective;

FIG. 2 is a longitudinal cross-section along line 2—2 of FIG. 1;

FIG. 3 is a vertical cross-section along line 3—3 of FIG. 2;

FIG. 4 is a vertical cross-section along line 4—4 of FIG. 2;

FIG. 5 is a cross-sectional view along line 5—5 of FIG. 2 showing the electrical connections to the conductive segments;

FIG. 6 is an enlarged cross-sectional view along line 6—6 of FIG. 1;

FIG. 7 is an end view along section line 7—7 of FIG. 6; and

FIG. 8 is a fragmentary section of the right hand end of the device shown in FIG. 2.

The apparatus comprises a hollow metallic elongated casing 2 which may be cylindrical as shown in FIG. 1 and entirely closed except for inlet openings for the exhaust gases and mixing fluid and an outlet opening. The casing 2 is comprised of three sections 2a, 2b, 2c bolted together end-to-end. The center section 2a is open at opposite ends, which ends are provided with radially outwardly extending flanges 4 and 4' respectively. To the left hand end of the section 2a, as shown in FIG. 2, is bolted a short hollow cylindrical section 2b closed at one end by a wall 6 and having a radially outwardly extending flange 8 in opposed relation to flange 4 of the section 2a. A wall member or partition 10 having a center opening 12 is positioned between the sections 2a and 2b and has openings adjacent its periphery for the passage of bolts 14 which also pass through the flanges 4 and 8 to maintain the sections and wall member secured to each other. On the surface of the wall member 10 facing the interior of the section 2a is secured, by means of bolts 15, a plate member 16 supporting, as by friction, the outer race of a ball bearing assembly 18. The wall member 10, as shown, has its central portion slightly recessed to accommodate a portion of the outer race. A pair of hollow tubes 20, 20' provided with valves extend through the end wall 6 for the injection of mixing fluids thereinto. The section 2a is provided with an inlet opening in its side into which an inlet pipe 22 extends for entry of the engine exhaust gases to be treated.

The hollow casing section 26 at the right hand end of section 2a is closed at one end by a wall 24 having a central opening and which abuts the flange 7 of section 2a and is bolted thereto. The opposite end of section 2c is normally open but closed by an end wall 26 having a central opening and secured thereto by any desired means, not shown, after certain parts described hereinafter, have been installed therein. The wall 24 has a central opening within which is secured the outer race of a second ball-bearing assembly 28 in axial alignment with ball-bearing assembly 18. Within the section 2a of the casing is located a plate member 30 provided with an axially extending flange 32 at its periphery and a central opening in alignment with the ball-bearing assemblies described above. Several other openings 34 for egress of fluids from section 2a are provided in the plate member 30. As can be seen from the above described construction, casing sections 2a, 2b and 2c are sealed off from each other.

A hollow tubular member 36 extending axially of casing 2 is secured to the inner races of the ball-bearing assemblies 18 and 28 and is supported by the central opening in plates 26 and 30. The tubular member 36 is provided with a plurality of small openings 38 through its peripheral wall along the length thereof. The end of said member extending into the section 2c is closed off and its passageway is plugged intermediate its ends, as at 38'. To the opposite end of the member 36 which extends through the end wall 26 is secured a pulley for the purpose of rotating it at a high speed. A plurality of fans are secured to and spaced along the tubular member 36. The fans are each comprised of a plurality of equiangularly spaced fan blades 40 about the periphery of the tubular member extending radially thereof and secured thereto by any suitable means such as by welding. The blades are so shaped and oriented as to propel fluids, while whirling them about in section 2a, from left to right in FIG. 2. Adjacent the closed end of tubular member 36 located in section 2b of the casing 2, is secured a pair of radially oppositely extending hollow pipes 42 with their ends cut at an angle to their axes other than 90° and in such directions as to form a pair of opposite scoop-like members 43 at their opposite ends. The passageways in the pipes register with respective openings through the wall of tubular member 36, so that as they are rotated the scoop-like members travelling at great speed through fluids in the section 2b will cause them to enter the passageways in pipes 42 and flow through openings 44 into the tubular member 36 and be forced outwardly through openings 38. Secured to the tubular member 36 for rotation therewith and located between walls 24 and 30 is an exhaust fan 46 which directs the gases or other fluids emanating from the openings 34 in plate member 30, into an outlet opening 48 in section 2a and from thence into an outlet pipe 50 in registration therewith.

A plurality of electrically conducting rods 52 extend axially of the cylinder 2 within section 2a, which latter acts as a mixing chamber for fluids emanating from openings 38 in tubular member 36 and the exhaust gases from inlet pipe 22. Each rod passes through and is secured to an insulator 54 mounted within a respective opening in each of the four fan blades shown. While only four rods per blade are shown, any number may be used and distributed along the blades in such a way that they do not cause any unbalance of the blades and tubular member 36 when they are rotated at a high speed. The rods are also distributed along each blade from the outermost edge thereof to substantially its center so as to define a wide path through which they pass during the rotation of member 36. Secured to the tubular member 36, for rotation therewith within the casing section 2c, is a plate 56 having one surface comprised of insulating material 58. Embedded in the insulating material but exposed at the outer surface thereof, are four equiangularly spaced conductive segments 60. The segments are of equal size and arcuate in shape and are electrically connected together by a conductor 62 within the insulation. The conductor 62 in turn, is connected to a cable 64 which extends along the passageway in tubular member 36 to a point adjacent the fan in section 2a closest to casing section 2c. An insulating duct 66 within the tubular member surrounds the cable. The ends of the conductive rods 52 protruding from the blades 40 of the last named fan are all electrically connected in common, as shown in FIG. 7, to cable 64.

In order to energize the conductive rods 52 a conductive metal plunger is slidably mounted within a dielectric socket member 68 secured within an opening in the end wall 24 of casing 2c. A spring 70 urges the plunger outwardly of the socket, the outer end of the plunger being of arcuate shape to firmly contact the conductive segments 60 in succession as they are moved past by rotation of plate 56 to which they are secured. An insulated lead 72 connects one terminal of a high voltage direct-current source (not shown) to a conductive post 74 passing through the casing section 2c but insulated therefrom and which is electrically connected to plunger 66. The opposite side of the source is connected to the casing. A weatherproof cover 76 surrounds the exposed portion of the conductive post. Upon rotation of the plate 56, each of the segments 60 will contact the end of the plunger in succession so as to energize all of the rods simultaneously A rotational electric field is thus intermittently created between the rods and the inner periphery of the casing, which field sweeps through the mixture of fluids and gases within the casing.

In operation, the exhaust from an internal combustion engine or the fumes from power generating equipment is led into section 2a of the casing 2. Mixing fluids such as water vapor, hydrogen peroxide or alcohol or mixtures thereof enter section 2b of the casing 2 through the valved inlet pipes 20, 20'. The tubular member 36 is rotated by means of a motor through the intermediary of a belt (not shown) trained about a pulley 78 secured to the end of member 36 projecting from the casing section 2c. As the pipes 42 rotate with member 36, their scoop-shaped ends force the mixing fluid in casing section 2b into the hollow tubular member 36 and they eventually escape from the openings 38 into the casing section 2a which is filled with the incoming exhaust gases. The fan blades as they rotate, cause intermingling of the fluids emanating from openings 38 with the incoming exhaust gases from intake 22 to create a whirlwind to provide a cyclonic mixing action thereof within the casing while at the same time driving the mixture towards openings 34. Simultaneously, the regularly recurring high voltage electric field established between the rods and the casing and also the member 36, is swept through the mixture of fluids in the casing to cause ionization of the molecules thereof. The charged fluids in casing section 2a then flow though the openings 34 in plate 32 and are emitted through opening 48 into the outlet pipe by action of the exhaust fan 46. The fluids may then be piped into the intake of the engine to thus utilize the unburned fuel which is normally emitted by the exhaust. Where the gases admitted to the inlet 22 are pollutants of the atmosphere consisting of stack gases resulting from the burning of diesel fuels or coal in the generation of power, my device is capable of efficiently treating such gases in order to break them down by ionization so as to remove the harmful ingredients therefrom.

Although the substantially radial high voltage electric field which sweeps through the mixture of fluids in the casing has been described as being established between the conductive rods 53 and the casing, it is also feasible to create a sweeping radially extending electric field by connecting all of the outer rods of the fan blades to one terminal of the voltage source and all the inner rods to the other terminal of the source, through the segments 60. The electrical connections for such an arrangement are, of course, obvious and would necessitate the addition of a slip ring on the insulation 58 concentric with the segments 60 and an additional plunger 66 for contacting the slip ring. A lead from the slip ring would then be connected to one of the radially inner pair or radially outer pair of rods 52 of each blade and the lead from the segments connected to the other thereof, in order to establish such radial field.

Having thus described my invention with the particularities required by the statutes, it should be understood that various modifications may be made by persons skilled in the art without departing from the spirit and scope of the invention as embodied in the claims.

What is claimed is:

1. Apparatus for electrically treating exhaust gases emanating from an internal combustion engine comprising:
   a closed elongated casing having inlet means adjacent one end for the exhaust gases,
   means for establishing a high intensity electrical field radially of the casing comprising,
   electrical conductor means extending longitudinally within the casing radially spaced from the inner wall thereof, and mounted for rotation about a longitudinal axis,
   the wall of said casing being provided interiorly thereof with a conductive surface extending entirely about the path of the conductor means,
   means for connecting said conductor means and conductive surface to a high voltage source to establish an electrical field therebetween,
   means for rotating the conductor means about said longitudinal axis to sweep the field in a path normal to the flow of gases within the casing, and
   means at the other end of the casing for receiving the gases subjected to said rotating electric field.

2. Apparatus according to claim 1 wherein the conductor means and conductive surface extend along a major length of the casing.

3. Apparatus according to claim 1 wherein the conductor means comprises a plurality of longitudinally extending conductors angularly spaced about said axis and radially spaced from the interior wall of the casing.

4. Apparatus according to claim 3 wherein the conductors conductive surface extend along a major length of said casing.

5. Apparatus for electrically treating exhaust gases emanating from an internal combustion engine comprising:
   a closed elongated casing,
   inlet means for the exhaust gases adjacent one end of the casing,
   means for producing a high intensity electrical field along the interior of said casing,
   means for propelling the gases toward the other end of the casing,
   means for rotating said electrical field through said propelled gases and about the axis of the casing,
   and means at said other end of the casing for receiving the gases subjected to said moving electric field, wherein the means for propelling the gases comprises rotatable fan blades within the casing, said means for producing said electrical field within the casing comprising a plurality of conductors parallel to the axis of the casing and connected to a high voltage source, at least some of said fan blades being spaced axially along the casing, said conductors being supported by and between said axially spaced blades.

6. Apparatus according to claim 5 including means for supplying said means for producing the high intensity electric field with an intermittent direct-current voltage.

7. Apparatus for electrically treating exhaust gases emanating from an internal combustion engine comprising:
   a closed elongated casing,
   inlet means for the exhaust gases adjacent one end of the casing,
   means for producing a high intensity electrical field along the interior of said casing,
   means for propelling the gases toward the other end of the casing,
   means for rotating said electrical field through said propelling gases and about the axis of the casing,
   and means at said other end of the casing for receiving the gases subjected to said moving electric field, further including a tubular member within the casing extending longitudinally therealong and spaced from the inner peripheral wall thereof,
   said tubular member being provided with a plurality of openings therealong through its peripheral wall,
   and means for introducing mixing fluids into one end of said tubular member,
   whereby the fluids emanating from the openings in the tubular member mix with the exhaust gases.

8. Aparatus according to claim 7 wherein the means for propelling the gases comprises rotatable fan blades within the casing.

9. Apparatus according to claim 8 wherein said means for producing said electrical field within the casing comprises a plurality of conductors parallel to the axis of the casing and connected to a high voltage source.

10. Apparatus according to claim 9 wherein at least some of said fan blades are spaced axially along the casing, said conductors being supported by and between said axially spaced blades.

11. Apparatus according to claim 7 including means for supporting said tubular member within said casing for rotation about its axis,
   and means for rotating said tubular member.

12. Apparatus according to claim 11 wherein the means for propelling the gases comprises rotatable fan blades within the casing.

13. Apparatus according to claim 12 wherein said means for producing said electrical field within the casing comprises a plurality of conductors parallel to the axis of the casing and connected to a high voltage source.

14. Apparatus according to claim 13 wherein at least some of said fan blades are spaced axially along the casing, said conductors being supported by and between said axially spaced blades.

15. Apparatus according to claim 11 wherein said fan blades are secured to said tubular member,
   at least some of said blades being axially spaced along said member.

16. Apparatus according to claim 15 wherein said means for producing said electrical field within the casing comprises a plurality of conductors parallel to the axis of the casing and connected to a high voltage source.

17. Apparatus according to claim 16 wherein at least some of said fan blades are spaced axially along the casing, said conductors being supported by and between said axially spaced blades.

18. Apparatus according to claim 11 wherein said casing is provided with a closed compartment at one end thereof having an inlet opening for the mixing fluids,
one end of said tubular member extending into said compartment,
said means for introducing the fluids into the tubular member comprising a scoop member supported on said tubular member adjacent said one end thereof for rotation therewith for scooping up the mixing fluids entering said inlet opening in the compartment and forcing them into said one end of the tubular member.

19. Apparatus according to claim 18 wherein the means for propelling the gases comprises rotatable fan blades within the casing.

20. Apparatus according to claim 19 wherein said means for producing said electrical field within the casing comprises a plurality of conductors parallel to the axis of the casing and connected to a high voltage source.

21. Apparatus according to claim 20 wherein at least some of said fan blades are spaced axially along the casing, said conductors being supported by said axially spaced blades.

22. Apparatus according to claim 18 wherein said means for producing said electrical field within the casing comprises a plurality of conductors parallel to the axis of the casing and connected to a high voltage source.

23. Apparatus according to claim 22 wherein at least some of said fan blades are spaced axially along the casing, said conductors being supported by and between said axially spaced blades.

24. Apparatus according to claim 23 including means for supplying said means for producing the high intensity electric field with an intermittent direct-current voltage.

* * * * *